Oct. 1, 1935.  R. H. MOULTON  2,015,757
SHOCK ABSORBER
Original Filed Aug. 20, 1930
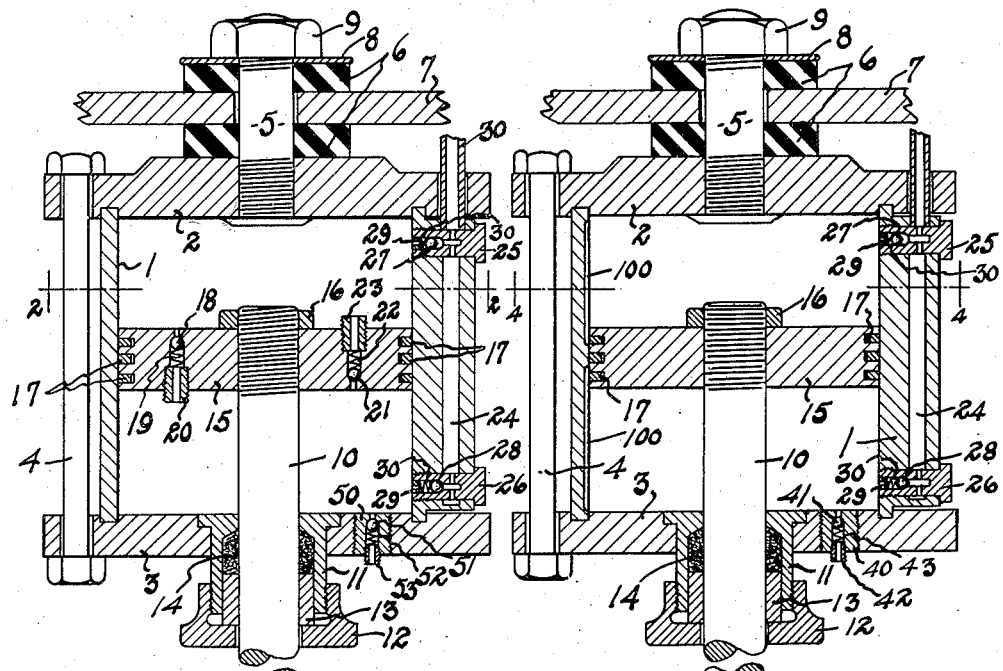
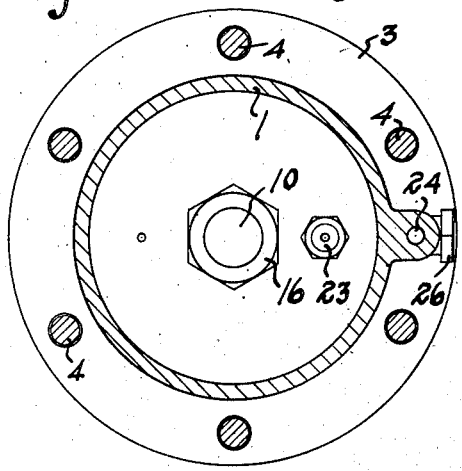
Fig. 2.
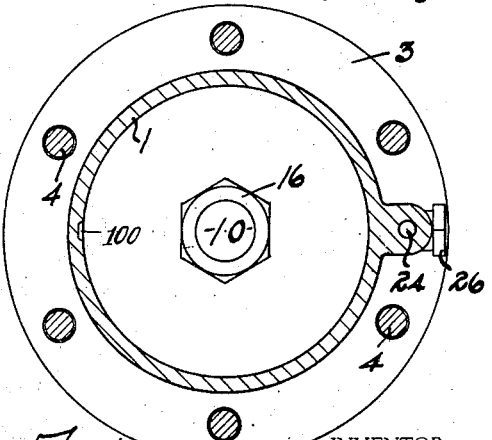
Fig. 4.
INVENTOR.
Rollin H. Moulton
BY
ATTORNEYS.

Patented Oct. 1, 1935

2,015,757

UNITED STATES PATENT OFFICE 2,015,757

SHOCK ABSORBER

Rollin H. Moulton, Berwyn, Ill., assignor to National Pneumatic Company, New York, N. Y., a corporation of West Virginia Original application August 20, 1930, Serial No. 476,590. Divided and this application November 17, 1934, Serial No. 753,431

10 Claims. (Cl. 188—88)

This invention is related to shock absorbers or cushioning devices, and more particularly to that class of device adapted to be used on road vehicles, airplanes, track vehicles, or in fact between any parts having relative movement therebetween where it is desired to retard or cushion the movements between said parts.

The general objects of this invention are the same as those set forth in full detail in applicant's copending application Serial No. 476,590, filed August 20, 1930 for Shock absorber, of which this is a divisional application.

These objects need not be repeated here, and in any event will be apparent from the following detail description of the structure.

This invention resides substantially in the combination, construction, arrangement and relative location of parts, all as will be described in full detail in the following specification.

In the drawing,

Fig. 1 is a vertical, central cross-sectional view showing one form of device in accordance with this invention;

Fig. 2 is a cross-sectional view thereof on the line 2—2 of Fig. 1;

Fig. 3 is a vertical, central, cross-sectional view through a modified form of the structure in accordance with this invention; and Fig. 4 is a cross-sectional view thereof on the line 4—4 of Fig. 3.

The structure of Figs. 1 and 2 comprises a cylinder 1 of any suitable material, dimensions and shape, closed at its ends by means of the guides or heads 2 and 3 which as illustrated, have grooves in which the ends of the cylinder wall seat to provide an airtight piston chamber. As will be apparent to those skilled in the art, the heads may be attached to the cylinder in a number of different ways to attain the major object of this construction of an airtight cylinder.

In the form illustrated the cylinder heads are securely seated and locked against the ends of the cylinder wall by means of bolts and nuts 4 which pass through apertured lugs or projections on the heads. Secured to the upper head by means of threads, for example, as illustrated, is a stud 5 which serves as means for attaching the device to one of the two relatively movable parts between which cushioning is to be effected. The movable part which may be, for example, the chassis or an arm attached thereto of a vehicle is illustrated at 7 having a hole therethrough in which the stud 5 fits, and being of slightly larger diameter. Seated on opposite sides of the member 7 and encircling the stud 5 are a pair of rubber or rubberized plugs 6. These parts are securely locked together by means of a washer 8, and a nut 9 which threadedly engages the upper end of the stud 5. The purpose of an enlarged bore for the stud 5 is to permit transverse movement of the device whereby its connection with the member 7 provides universal movement with respect thereto.

At 10 is a slide piston rod projecting interiorly and exteriorly of the piston chamber and permitted sliding and airtight movement with respect to the head by passing through a packing gland structure as shown. This structure comprises a tubular flange member 11 protruding through the head 3 and forming an airtight seal therewith. An adjustable cap 12 threadedly engages the tubular member 11 and cooperates with a sleeve 13 snugly fitting the piston rod and serving as a plunger for compressing the packing material 14 into airtight engagement with the piston rod while permitting sliding movement thereof.

As illustrated the internally projecting end of the piston rod 10 has threadedly mounted thereon a piston disc 15 which may be locked in place by means of a lock nut 16. The piston disc is provided with a plurality of annular grooves in which, as illustrated, metal piston rings 17 are mounted for frictional engagement with the inner wall of the cylinder. The piston disc 15 is provided with a pair of passages extending therethrough parallel to the axis of the system, and providing seats for the valve members 18 and 21. The valve member 18 is normally urged to its seat by means of a spring 19 tensioned by means of an adjustable apertured plug 20 which in turn may be locked in place by any suitable means such as a lock nut. In a similar way the valve member 21 is urged towards its seat by means of a spring 22 tensioned by means of an apertured plug 23. It will be noted that the valve members seat in opposite directions so that valve member 18 is unseated by pressure acting upon the upper face of the piston and valve member 21 is unseated by pressure acting on the lower face of the piston.

Formed in the cylinder wall in any suitable way is a passage 24 into which fluid under pressure from an external source may be supplied through the pipe connection 30, which may be flexible if desired. In accordance with this invention it is intended to operate the device with super-atmospheric pressure conditions in both ends of the cylinder.

Therefore, in accordance with this invention, and as more fully disclosed in the above mentioned parent application, fluid under pressure is supplied in the passage 24 through pipe 30, from any suitable source such as the air brake system of a railway or road vehicle, or from a specially provided fluid pressure source. Extending from the passage 24 to the interior of the piston chamber are a pair of passages in which the valve casing members 25 and 26 are mounted. These members 25 and 26 have passages formed therein, as indicated, so as to establish communication between the passage 24 and the piston chamber under the control of the valve members 27 and 28. These valve members are held in seated position by means of the springs 30 which may be tensioned by the adjustment of the apertured plugs 29. Both of these valves seat in the same direction. In the head 3 is a threaded passage extending therethrough in which a threaded apertured plug 50 is mounted. The aperture extends entirely through the plug and provides a seat for the valve member 51 which is urged to seating position by spring 52, the tension of which may be adjusted by means of the apertured plug 53.

The lower end of the piston rod 10 passes through the other relatively movable member 31, the movement of which is to be cushioned with respect to the member 7, and representing for example the axle or the arm attached thereto of a vehicle.

This member 31 receives the end of piston rod 10 through an enlarged bore, and is engaged on opposite sides by means of the resilient or rubber plugs 32 in turn engaged by the threads 33, all of which encircle the piston rod. The parts 31, 32 and 33 are clearly locked to the piston rod by means of the nuts 34 and 35. Here again the enlarged bore in the member 31 permits of a universal movement of the device with respect to the member 31.

In the operation of this device the parts will be so proportioned and adjusted that under normal conditions the piston is substantially at the center of the cylinder. Pressure on the opposite faces of the piston will be above atmospheric pressure, as determined by the pressure supplied thereto from the source through pipe 30, passage 24, and valves 28 and 29. The pressure being substantially balanced upon the faces of the piston will not leak through the valves 18 and 21 from one side of the piston to the other. When the piston moves upwardly under the force of a shock transmitted through the member 31, the air above it will be compressed more firmly seating valve 21 and unseat valve 18 to bypass air below the piston after the piston has moved a predetermined amount, depending upon the adjustment of the apparatus. Before this action occurs reduction in pressure below the piston due to its upward movement will result in the unseating of valve 28, permitting the introduction of additional air from the source until the valve reseats. When the piston moves downwardly valve 18 will be firmly seated and air will bleed through the piston to the upper end of the cylinder through valve 21 when it is unseated at a predetermined point of downward movement of the piston.

Before this occurs any reduction in pressure in the upper end of the cylinder will be compensated for by the introduction of air from the source through valve 27. If the downward movement of the piston is rapid enough to raise the pressure of the lower end of the cylinder above a predetermined amount, valve 51 will be opened to permit a certain amount of the compressed air to escape into the atmosphere. The strength of spring 52 is sufficiently greater than the strength of spring 22 so that valve 21 will open at a lower pressure than valve 51.

As will be apparent to those skilled in the art, this device will be very effective not only as absorbing the direct shock but in providing an efficient snubbing action which is smooth and uniform, and not likely to be jerky, as is common with devices where no provision is made to keep the pressure below the piston at the proper value during the upward movement thereof. In other words, pressure on both sides of the piston can never fall below the pressure of the source connected to pipe 30 which is of course predetermined by the conditions to be met. To state it another way, the cylinder ends are preloaded in the sense that a certain minimum super-atmospheric pressure is maintained in the cylinder ends under all operating conditions.

The modified structure of Figs. 3 and 4 is substantially similar to the arrangement of Figs. 1 and 2 in many parts. For this reason similar parts have been given the same reference numerals, and need not be again described. In this form of the invention it will be noted no valves are supplied on the piston.

In this case the cylinder wall is provided with grooves 100 that extend from the heads towards the center but terminate short of each other at approximately the center of the cylinder. Thus, when the parts are at rest and in normal position as illustrated in Fig. 3, the piston disc cuts off communication between the ends of the cylinders through the grooves 100. Thus the major difference between the two structures is that in the arrangement of Fig. 3 the grooves 100 take the place of the valves 18 and 21. Upon downward movement of the piston 15 air may bleed from the upper end of the cylinder into the lower end through the upper grooves 100 when the piston has moved far enough to uncover the lower end of the upper groove. In a like manner when the piston has moved down far enough to uncover the upper end of the lower groove 100, air will bleed from the lower end of the cylinder into the upper end. Otherwise the action of this device is the same as that previously described.

From the above description it will be apparent that this invention resides in certain principles of construction and operation which may be embodied in other physical forms and carried out in other ways without departure from the scope thereof. I do not, therefore, desire to be strictly limited to the disclosure as given for purposes of illustration, but rather to the scope of the appended claims.

What I seek to secure by United States Letters Patent is:

1. In a shock absorber, the combination of a cylinder, a piston disposed therein, a piston rod connected to said piston and extending outwardly of one end of said cylinder, valves in said piston for by-passing fluid from one side of said piston to the other after a predetermined pressure has been reached in the side of said cylinder toward which said piston is traveling, said cylinder having a channel provided with valves communicating with each end of said cylinder for supplying said ends of said cylinder with fluid, said valves being operable upon movement of said piston away from said valves.

2. In a shock absorber, the combination of a cylinder, a piston disposed therein, a piston rod connected to said piston and extending outwardly of one end of said cylinder, valves in said piston for by-passing fluid from one side of said piston to the other after a predetermined pressure has been reached in the side of said cylinder toward which said piston is travelling, said cylinder having a channel provided with valves communicating with each end of said cylinder for supplying said ends of said cylinder with fluid, said valves being operable upon movement of said piston away from said valves, and a valve operable after a predetermined pressure has been reached to exhaust fluid from one end of said cylinder.

3. In a shock absorber, the combination of a cylinder, a piston disposed therein, a piston rod connected to said piston and extending outwardly of one end of said cylinder, a channel in the cylinder wall communicable with each side of said piston upon predetermined movement thereof, and means for supplying fluid to each side of said piston.

4. In a shock absorber, the combination of a cylinder, a piston disposed therein, a piston rod connected to said piston and extending outwardly of one end of said cylinder, channels in the cylinder wall communicable with each side of said piston upon predetermined movement thereof, means for supplying fluid to each side of said piston.

5. In a shock absorber, a cylinder, a piston disposed therein, a piston rod connected to said piston and extending outwardly of one end of said cylinder, means for supplying air into the cylinder on opposite sides of the piston to maintain the pressure therein above atmospheric pressure for all piston positions, and means for discharging air from the cylinder at the piston rod end if the pressure in that end exceeds a predetermined value.

6. In a shock absorber, a cylinder, a piston disposed therein, a piston rod connected to said piston and extending outwardly of one end of said cylinder, means for supplying air into the cylinder on opposite sides of the piston to maintain the pressure therein above a predetermined value for all piston positions, means for discharging air from the cylinder at the piston rod end if the pressure in that end exceeds a predetermined value, and means on the piston for by-passing air from either end into the other.

7. In a shock absorber, a cylinder, a piston disposed therein, a piston rod connected to said piston and extending outwardly of one end of said cylinder, means for supplying air into the cylinder on opposite sides of the piston to maintain the pressure therein above atmospheric pressure for all piston positions, valve means for discharging air from the cylinder at the piston rod end if the pressure in that end exceeds a predetermined value, and means for by-passing air from either end of the cylinder into the other.

8. In a shock absorber, a cylinder, a piston disposed therein, a piston rod connected to said piston and extending outwardly of one end of said cylinder, means for supplying air into the cylinder on opposite sides of the piston to maintain the pressure therein above atmospheric pressure for all piston positions, means for discharging air from the cylinder at the piston rod end if the pressure in that end exceeds a predetermined value, and means for by-passing air from either end of the cylinder to the other upon a predetermined movement of the piston in either direction.

9. In a shock absorber, a cylinder, a piston disposed therein, a piston rod connected to said piston and extending outwardly of one end of said cylinder, means for supplying air into the cylinder on opposite sides of the piston to maintain the pressure therein above a predetermined value for all piston positions, means for discharging air from the cylinder at the piston rod end if the pressure in that end exceeds a predetermined value, and means comprising grooves in the cylinder wall for by-passing air from either end of the cylinder to the other upon a predetermined movement of the piston in either direction.

10. In a shock absorber, a cylinder, a piston disposed therein, a piston rod connected to said piston and extending outwardly of one end of said cylinder, means forming a passage having valves at the ends thereof for introducing air under pressure to the cylinder on opposite sides of the piston and grooves in the cylinder wall communicable with each side of said piston upon predetermined movement thereof.

ROLLIN H. MOULTON.